United States Patent

Seemann

Patent Number: 5,348,138
Date of Patent: Sep. 20, 1994

[54] NO-NEST BIRD GATE

[76] Inventor: Karl F. Seemann, Box 238, Dalmeny, Saskatchewan, Canada, S0K 1E0

[21] Appl. No.: 110,697

[22] Filed: Aug. 23, 1993

[30] Foreign Application Priority Data

Jul. 20, 1993 [CA] Canada .................................. 2,100,907

[51] Int. Cl.⁵ .............................................. B65G 33/00
[52] U.S. Cl. .................................... 198/671; 198/657; 49/58
[58] Field of Search .............. 198/306, 657, 670, 671, 198/860.3, 860.4; 49/58; 52/101; 210/131

[56] References Cited

U.S. PATENT DOCUMENTS

| | | | |
|---|---|---|---|
| 222,389 | 12/1879 | Earle | 210/131 |
| 231,544 | 8/1880 | Darst | 210/131 |
| 373,077 | 11/1887 | Larrabee | 210/131 |
| 891,012 | 6/1908 | Shepard | 210/131 |
| 906,562 | 12/1908 | Rue et al. | 210/131 |
| 928,481 | 7/1909 | Tenold et al. | 210/131 |
| 929,514 | 7/1909 | Tenold et al. | 210/131 |
| 961,834 | 6/1910 | Barlett | 210/131 |
| 3,232,419 | 2/1966 | Rasmussen | 198/671 X |
| 3,289,840 | 12/1966 | Kahn | 210/131 |
| 4,256,217 | 3/1981 | Mathias | 198/671 X |
| 4,356,087 | 10/1982 | Miles | 210/131 |
| 4,702,828 | 10/1987 | Mehmert et al. | 210/131 |

Primary Examiner—James R. Bidwell
Attorney, Agent, or Firm—Murray E. Thrift; Adrian D. Battison; Stanley G. Ade

[57] ABSTRACT

A bird gate for a grain auger outlet includes a panel that extends across the auger outlet in a normal, closed position. It is biased to that position by a spring. When grain is delivered from the auger, it falls on the panel, biasing the panel to an open position and allowing the grain to be delivered from the auger. The closed position of the gate prevents birds from entering the auger for nesting.

14 Claims, 3 Drawing Sheets

NO-NEST BIRD GATE

FIELD OF THE INVENTION

The present invention relates to a bird gate and more particularly to a bird gate for grain augers.

BACKGROUND

The outlet of a grain auger is a tubular opening, usually circular or oval, leading into the auger tube housing the auger flighting. This is a very attractive nesting site for birds so that cleaning bird nests from augers is an annual chore. The present invention proposes a gate for the auger outlets that addresses this problem.

SUMMARY

According to the present invention there is provided a bird gate for a grain auger outlet comprising:
  a panel configured to extend across the inside of the auger outlet;
  mounting means for mounting the panel in the auger outlet for movement between a closed position extending across the outlet and an open position extending along the outlet; and
  biasing means for biasing the panel toward the closed position.

The gate is installed inside the outlet so that there are no external parts to be damaged when the auger is moved from place to place. When the auger is idle, the gate panel extends across the outlet and birds cannot enter the auger to build a nest. When the auger is started, grain flow out of the outlet falls onto the panel and overcomes the closing bias to open the panel and allow the grain to flow out of the auger. The gate is thus effectively "invisible" in its operation.

An embodiment of the gate will be described in the following by way of example only. It is to be understood that other embodiments are possible and are envisaged, especially where the physical attributes of the auger outlet dictate modifications in the configuration of the gate.

BRIEF DESCRIPTION OF THE DRAWINGS

In the accompanying drawings, which illustrate an exemplary embodiment of the present invention.

DETAILED DESCRIPTION

Figure 1:
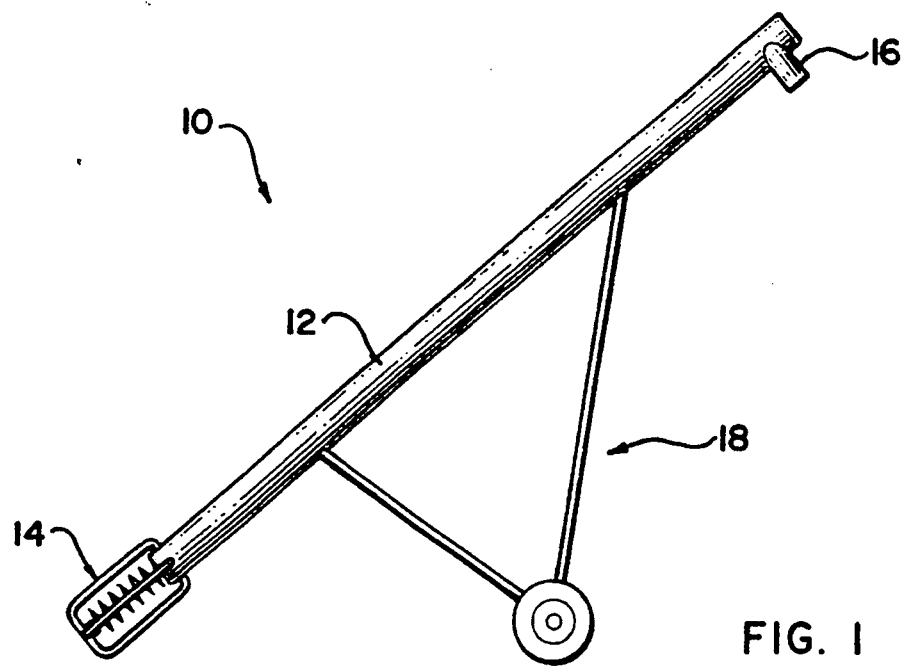
FIG. 1 is a side view of an auger.

Referring to the accompanying drawings, FIG. 1 illustrates a conventional grain auger 10. This has an auger tube 12 through which the grain is transported by internal flighting (not shown). At the lower end of the tube is an inlet 14, while at the upper end of the tube is a tubular outlet 16. The auger tube 12 is supported on a wheeled undercarriage 18.

In use, grain is transported from the inlet, along the auger tube 12 to be discharged out of the outlet 16.

As illustrated in FIGS. 2 through 6, the auger outlet 16 is equipped with a bird gate 20 to prevent birds from entering the outlet and building nests. This gate includes a panel 22 configured to extend across the outlet to effect the desired restriction of access. The panel has two U-shaped slots 24 defining lugs 25 that may be bent out of the plane of the panel as shown particularly in FIGS. 5 and 6. The lugs are offset from the centre of the panel. The two lugs have respective holes 26 that accommodate a pivot rod 28 extending across the panel, generally parallel to the plane of the panel and offset eccentrically to one side of the panel.

The opposite ends of the rod extend through two holes 30 in the auger outlet 16, and the rod ends 32 are bent over to retain the rod in position. The rod, when installed, is eccentrically located with respect to the outlet tube.

A torsion spring 34 has a coil 36 that surrounds the rod 28 between the two lugs 25. One end 38 of the spring is formed into a U-shape and engages the panel 22. The opposite end 40 the spring extends from the coil through a hole 42 in the outlet 16. The end 44 of the spring end 40 is bent over to secure the spring end to the outlet 16. A spacer 46 on the spring end 40 provides the proper spacing between the inside of the outlet 16 and the mounting rod of the gate panel.

Figure 2:
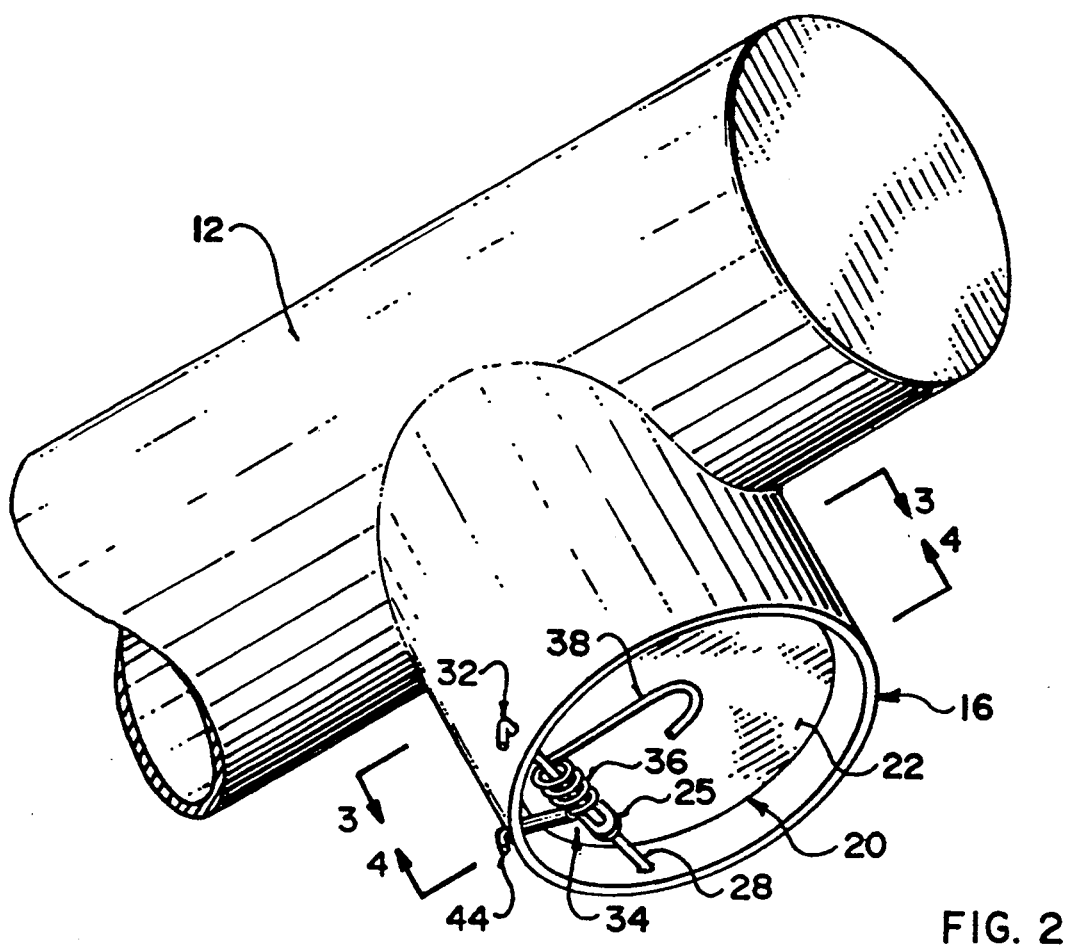
FIG. 2 is an isometric of an outlet end of an auger equipped with the bird gate.
Figure 3:
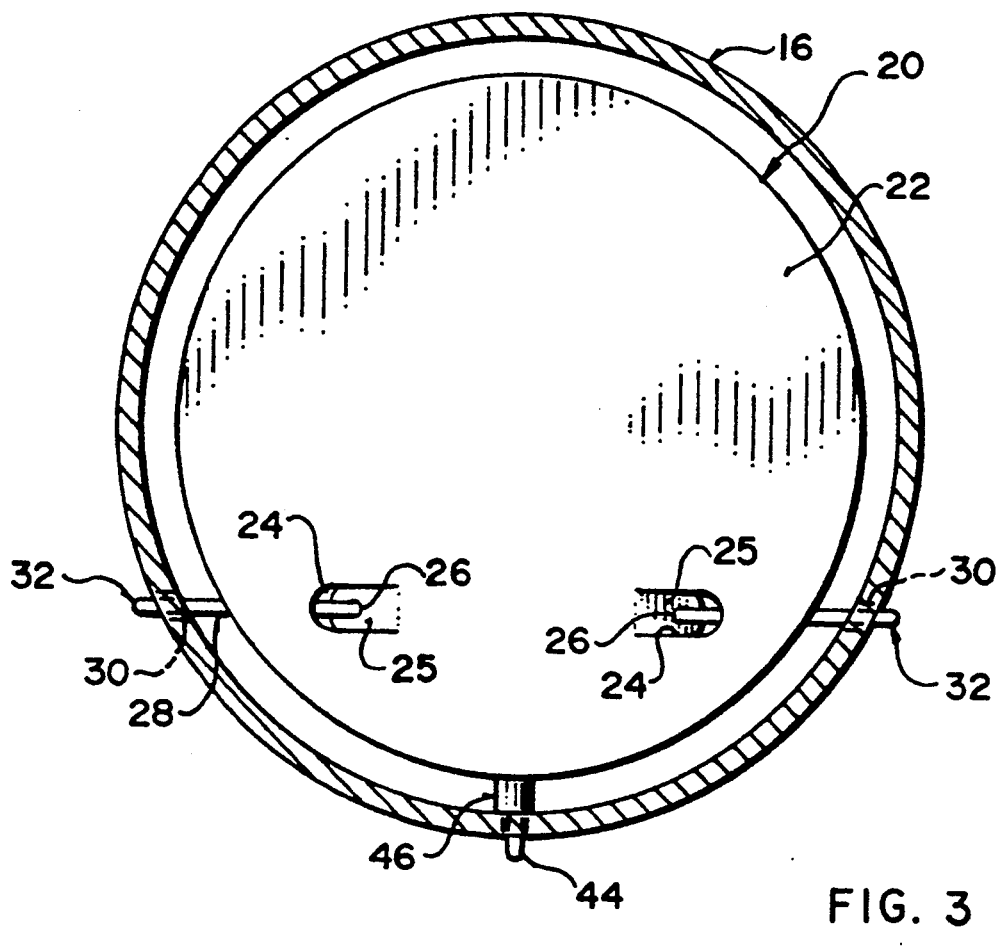
FIG. 3 is a view along line 3—3 of FIG. 2.
Figure 5:
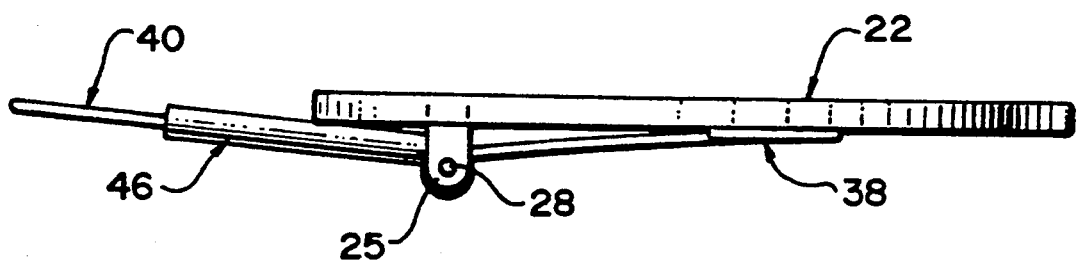
FIG. 5 is a side view of the gate.
Figure 4:
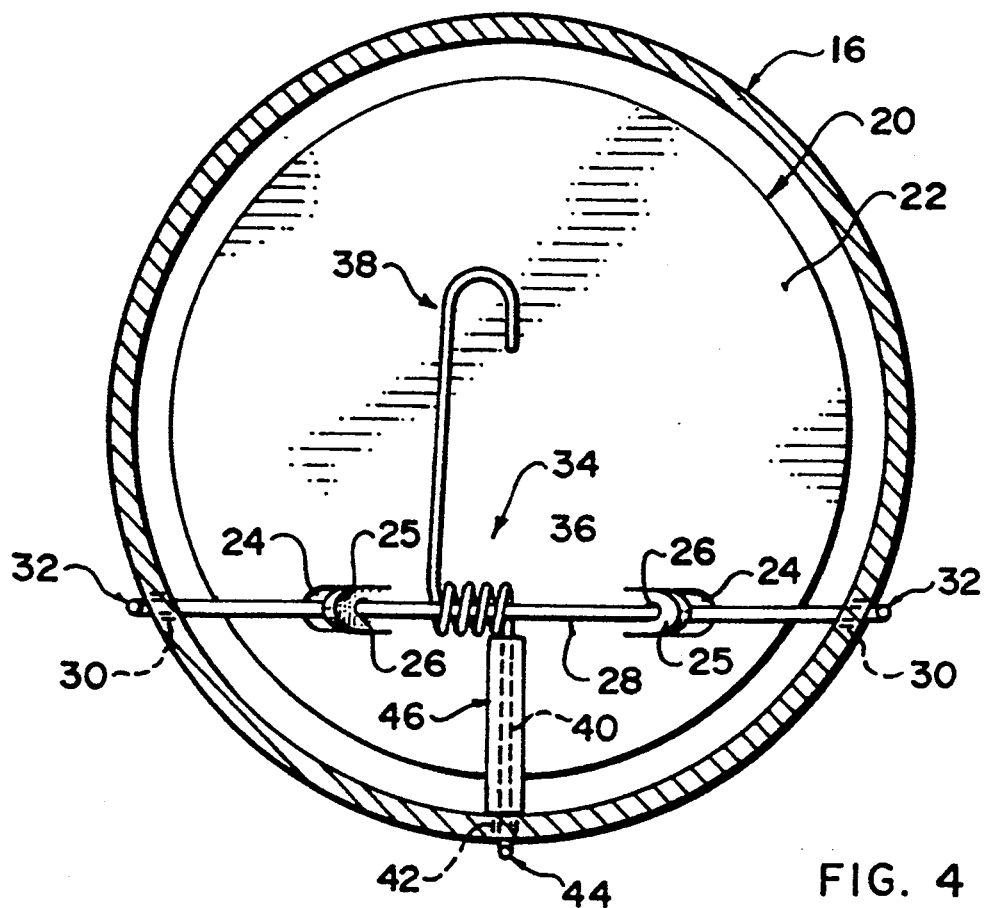
FIG. 4 is a view along line 4—4 of FIG. 2.
Figure 6:
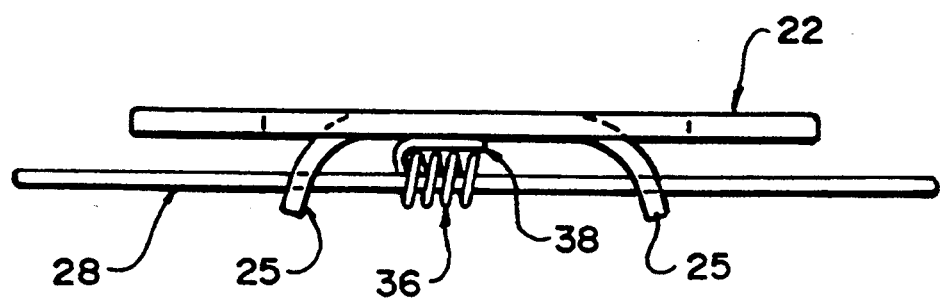
FIG. 6 is a front view of the gate.

The gate can easily be mounted in the auger outlet simply by drilling three holes in the side wall of the outlet at the appropriate locations. In FIG. 2, the holes are offset towards the lower side of the outlet. The panel is then installed by threading the rod 28 and the spring end 40 into the openings, and bending their ends over. The spring and rod are located beneath the panel so that in the normal course of events, grain passing through the outlet will not interfere with the proper operation of these parts.

The normal position of the panel 22 is the closed position extending across the outlet 16. As grain is fed along the auger and dumped onto the panel, the weight of the grain overcomes the biasing force of the spring so that the panel will tip downwardly about the axis of the red 28 to allow grain to discharge from the auger in the usual way. When the discharge of grain is stopped, the biasing force returns the panel to the normal, closed position to prevent birds from entering the empty auger to nest.

While one embodiment of the present invention has been described in the foregoing, it is to be understood that other embodiments are possible within the scope of the invention. For example, different types of biasing and panel mounting arrangements may suggest themselves. In addition, some modifications will be required where the tubular outlet is not circular but some other shape, for example oval. With an oval outlet, it may be of benefit to offset the pivot rod eccentrically to the upper side of the outlet. With exceptionally long ovals, two gates may be used, at opposite ends of the oval. It has been found that a clearance of about ½ inch (1.25 cm) around the gate panel is adequate in most cases to inhibit bird entry. Dimensions and shapes will all vary according to the configurations and sizes of the outlets. It is also possible to use panels other than the solid plastic panel described above. For example, an expanded metal mesh panel may be used in some cases.

This invention is therefore to be considered limited solely by the scope of the appended claims.

I claim:
1. A bird gate for a grain auger outlet comprising:
  panel means configured to extend across the inside of the auger outlet;
  mounting means for mounting the panel means in the auger outlet for movement between a closed posi- tion extending across the outlet and an open position extending along the outlet; and biasing means for biasing the panel means toward the closed position.

2. A gate according to claim 1 wherein the panel means comprise a single panel.

3. A gate according to claim 2 wherein the mounting means comprise pivot means for mounting the panel to pivot about an axis substantially parallel to the panel and eccentrically positioned with respect to the panel.

4. A gate according to claim 3 wherein the pivot means comprise a rod and rod engaging lugs on the panel.

5. A gate according to claim 1, wherein the biasing means comprise a spring.

6. A gate according to claim 4 wherein the biasing means comprise a coil spring surrounding the rod, one end of the spring engaging the panel and an opposite end of the spring projecting from the rod for engagement with the auger outlet.

7. A gate according to claim 1, wherein the panel comprises a plastic material.

8. A grain auger having a tubular outlet and a bird gate mounted in the outlet, the gate comprising:

panel means positioned in the outlet and configured to extend across the outlet;

mounting means mounting the panel means in the outlet for movement between a closed position extending across the outlet and an open position extending along the outlet; and biasing means biasing the panel means to the closed position.

9. A gate according to claim 8 wherein the panel means comprise a single panel.

10. An auger according to claim 9 wherein the mounting means comprise pivot means mounting a panel for pivotal movement about an axis extending across the outlet and eccentrically offset with respect to the outlet and the panel.

11. An auger according to claim 10 wherein the pivot means comprise a rod and rod engaging lugs on the panel, opposite ends of the rod being engaged with the outlet.

12. An auger according to claim 8, wherein the biasing means comprise a spring.

13. An auger according to claim 12 wherein the biasing means comprise a coil spring positioned around the rod, with one end of the coil spring engaged with the panel and the opposite end of the spring engaged with the outlet.

14. An auger according to claim 9, wherein the panel comprises a plastic material.

* * * * *